US009600672B1

(12) United States Patent
Ramalingam

(10) Patent No.: US 9,600,672 B1
(45) Date of Patent: Mar. 21, 2017

(54) DYNAMIC FUNCTION SWITCHING

(71) Applicant: AMAZON TECHNOLOGIES, INC., Seattle, WA (US)

(72) Inventor: Harsha Ramalingam, Kirkland, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 277 days.

(21) Appl. No.: 14/560,374

(22) Filed: Dec. 4, 2014

(51) Int. Cl.
*G06F 21/57* (2013.01)
*G06F 9/45* (2006.01)

(52) U.S. Cl.
CPC ............ *G06F 21/577* (2013.01); *G06F 8/41* (2013.01); *G06F 2221/033* (2013.01)

(58) Field of Classification Search
CPC ..... G06F 21/577; G06F 8/41; G06F 2221/033
See application file for complete search history.

(56) References Cited

U.S. PATENT DOCUMENTS

| 2004/0139340 | A1* | 7/2004 | Johnson | G06F 21/14 |
| | | | | 713/194 |
| 2005/0183072 | A1* | 8/2005 | Horning | G06F 21/14 |
| | | | | 717/140 |
| 2005/0262347 | A1* | 11/2005 | Sato | G06F 21/16 |
| | | | | 713/176 |
| 2006/0053307 | A1* | 3/2006 | Xu | G06F 21/14 |
| | | | | 713/190 |
| 2007/0006314 | A1* | 1/2007 | Costa | G06F 21/554 |
| | | | | 726/25 |
| 2007/0044153 | A1* | 2/2007 | Schuba | G06F 21/55 |
| | | | | 726/24 |
| 2008/0028464 | A1* | 1/2008 | Bringle | G06F 21/33 |
| | | | | 726/22 |
| 2008/0148061 | A1* | 6/2008 | Jin | G06F 21/14 |
| | | | | 713/187 |
| 2009/0083521 | A1* | 3/2009 | Sato | G06F 21/14 |
| | | | | 712/220 |
| 2009/0113550 | A1* | 4/2009 | Costa | G06F 21/52 |
| | | | | 726/25 |
| 2009/0217008 | A1* | 8/2009 | Sato | G06F 21/125 |
| | | | | 712/221 |
| 2010/0058301 | A1* | 3/2010 | Myles | G06F 8/41 |
| | | | | 717/142 |
| 2010/0250906 | A1* | 9/2010 | Singh | G06F 21/14 |
| | | | | 712/234 |

(Continued)

*Primary Examiner* — Darren B Schwartz
(74) *Attorney, Agent, or Firm* — Lindauer Law, PLLC

(57) ABSTRACT

Techniques are described for dynamically enabling or disabling portions of an executing software module based on control data. During compilation of source code for a software module, switching instructions may be generated to enable the conditional bypassing of executable instructions for one or more functions described in the source code. In some cases, the switching instructions may be generated for the public functions of a software module. During execution of the software module, the switching instructions may trap a call to a function and dynamically determine whether to execute the function based on the value of control data corresponding to the function. A user interface may be presented to enable an operator to set the control data to enable or disable the execution of one or more functions.

20 Claims, 14 Drawing Sheets

(56) References Cited

U.S. PATENT DOCUMENTS

2011/0302566 A1* 12/2011 Abadi ................ G06F 21/577
  717/168
2013/0163755 A1* 6/2013 Nagai ................ H04L 9/0822
  380/44

* cited by examiner

DYNAMIC FUNCTION SWITCHING

BACKGROUND

Providers of online services or other computing services may deploy a large number of computing devices that execute a large number of software modules such as applications, libraries, interfaces, and so forth. In a complex environment that includes many software modules, it may be a challenge to ensure that the software modules are not vulnerable to attacks by malicious individuals or processes. In some cases, an organization may employ third party software provided by external developers. After a security vulnerability is detected in third party software, it may take several days for the software provider to create and release a patch to correct the vulnerability. During that delay, the software may be vulnerable to attack.

Figure 1:
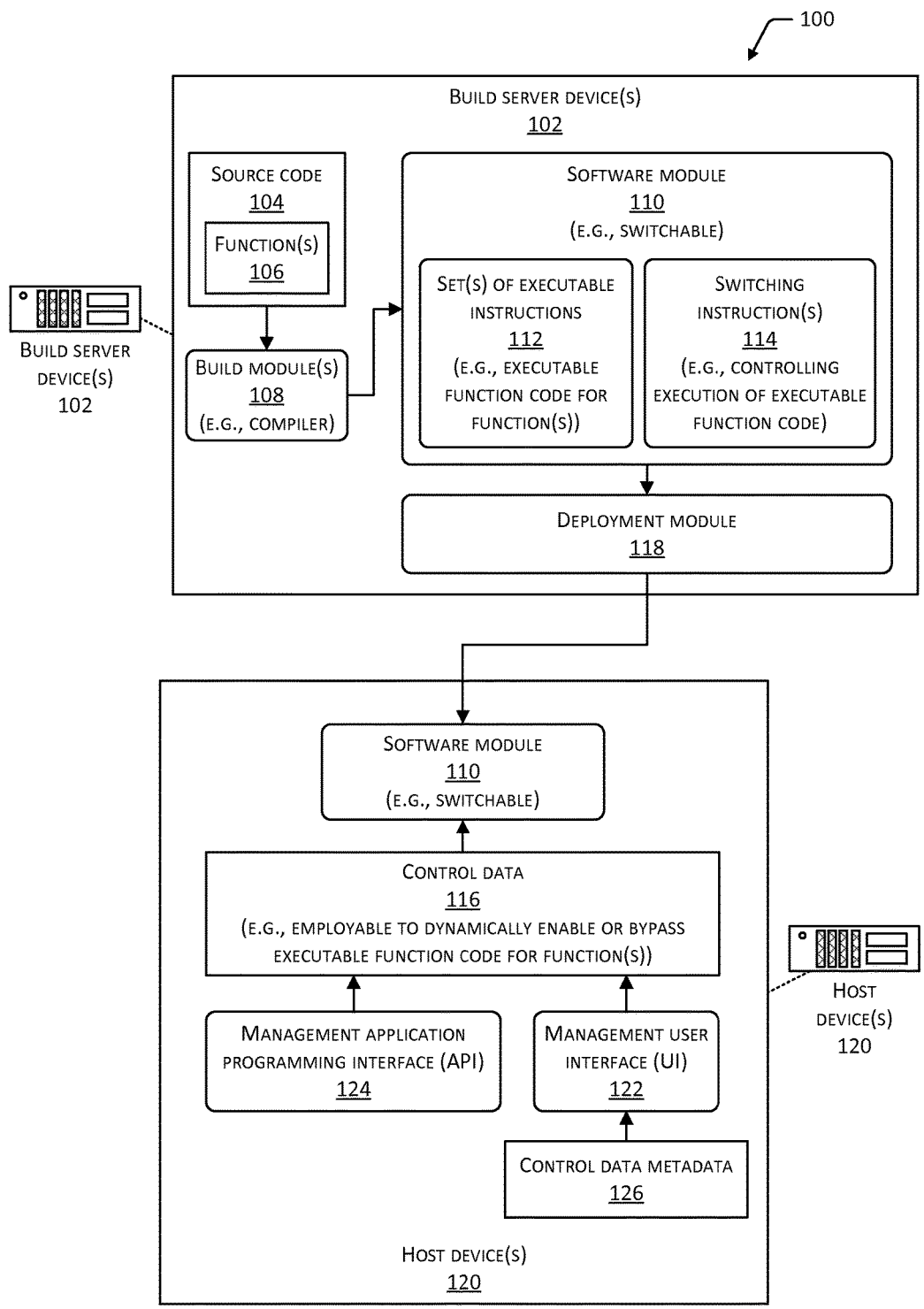
FIG. 1 depicts an environment for dynamic switching of portion(s) (e.g., function(s)) of an executable software module based on control data.

Certain implementations and embodiments will now be described more fully below with reference to the accompanying figures in which various aspects are shown. Aspects may be implemented in many different forms and should not be construed as limited to the implementations set forth herein. Like numbers refer to like elements throughout this disclosure.

DETAILED DESCRIPTION

This disclosure describes implementations of systems, devices, methods, and computer-readable media for dynamically enabling or disabling the execution of one or more portions, such as function(s), of an executing software module. During compilation of source code to generate an executable software module, one or more portions of the software module may be generated to include switching instructions that enable those portion(s) to be bypassed during execution of the software module. For example, at least some of the functions (e.g., public functions) described in the source code of the software module may be compiled such that the generated executable code includes switching instructions. During execution, the switching instructions may access control data that indicates whether each of the switchable portion(s) is to be executed or bypassed. In cases where an executable code portion is bypassed, the switching instructions may emit error information such as a return code, assertion, or exception to indicate to a calling process that the code portion has been bypassed or otherwise disabled.

A function may include a subroutine, method, procedure, routine, subprogram, or other callable unit of a software module. A function may be described in the source code of the software module. The source code description of a function may be compiled, linked, built, or otherwise processed to generate a set of executable instructions that perform the function when the software module is executed. Vulnerabilities in a software module may be exposed as a result of security defects in one or more functions described in the source code of the software module. For example, in an object oriented programming language a function may comprise a method declared within a class, and the method may include source code that exposes a security vulnerability. Alternatively in a non-object oriented programming language or in a machine language programming model, a function may be a block of code, such as a subroutine, that includes code that exposes a security vulnerability.

After a vulnerability is discovered in software, several days may elapse before the software patch is created, released, and installed to address the vulnerability. During this elapsed time, the software may be vulnerable to attack by malicious individuals or processes attempting to exploit the vulnerability. In some implementations, one or more functions of a software module may be compiled such that the function(s) may be dynamically switched on or off at any time prior to, or during, execution of the software module. Such dynamic switching may mitigate the risk due to a security vulnerability by preventing the execution of the code that includes the vulnerability.

In some implementations, the determination of the function(s) or other portion(s) of a software module to be compiled to include the switchable feature may be based on directives inserted into the source code by a software designer, developer, program manager or other personnel. Such directives may be parsed by the compiler and employed by the compiler to determine which function(s) or other portion(s) are to be compiled to include the switchable feature. Alternatively, the compiler may be configured to include the switchable feature when generating executable code for particular functions. For example, the compiler may include the switchable feature for public functions. Public functions may include those functions that are callable by other function(s) executing in another software module. Public functions may also include those functions that are callable by other function(s) or that are member(s) of different class, object, or subprogram relative to the public function.

In some cases, the compiler may include the switchable feature when generating executable code for functions that perform a particular type of functionality. For example, the switchable feature may be provided for functions such as one or more of the following:

Functions that are exposed to an end user, or that receive or process data associated with an end user;

Functions that access data that is protected, such as sensitive or confidential data;

Functions that employ credentials to access other systems or that participate in secure communications with other systems;

Functions that are included in an application programming interface (API) to be called from other software modules; or other functions.

The source code portions that are built to be switchable may encapsulate, at any level, the source code that includes the security vulnerability to be isolated via the switching feature. After a software module has been compiled or otherwise built to incorporate the switchable feature for one or more portions (e.g., functions), the software module may be executed on one or more host devices. When a security vulnerability is exposed in the software module, an operator or other individual may determine which portion(s) are to be dynamically disabled to mitigate the risk that an attacker may exploit the vulnerability. Control data may be set to switch off the execution of those portion(s) until the security vulnerability is fixed. In some cases, an operator may determine the portion(s) to be disabled such that the effect of the disabled code is minimized. Because switching off certain portion(s) of a software module may disable some amount of functionality of the software module, an operator may weigh the cost of the reduced functionality against the reduced risk of an attack that exploits the vulnerability. After a software provider builds and distributes a patch to fix the security vulnerability, the operator may reset the control data to re-enable the execution of the previously disabled portion(s).

The switching on or off of function(s), or other portion(s), of a software module may be dynamic in that the disabling or enabling of the portion(s) may not require a recompilation or rebuild of the source code of the software module. The control data may be set during the execution of the software module to alter the runtime behavior of the software module in response to a security vulnerability in the software.

FIG. 1 depicts an environment 100 in which implementations may operate. As shown in FIG. 1, the environment 100 may include one or more build server devices 102. The build server device(s) 102 may comprise any type of computing device, including but not limited to a network computer, a server computer, a mainframe computer, a distributed computing device (e.g., a cloud server), a personal computer, a smartphone, a tablet computer, a wearable computer, an implanted computer, a mobile gaming device, an electronic book reader, an automotive computer, a desktop computer, a laptop computer, a game console, a home entertainment device, and so forth. Although examples herein may describe the build server device(s) 102 as physical device(s), implementations are not so limited. In some cases, the build server device(s) 102 may include one or more of a virtual computing environment, a hypervisor, an emulation, or a virtual machine executing on one or more physical computing devices. In some cases, two or more of the build server devices 102 may comprise a cluster, cloud, farm, or other grouping that coordinates operations to provide load balancing, failover support, parallel processing capabilities, shared storage resources, or other aspects. The build server device(s) 102 are described further with reference to FIG. 5.

The build server device(s) 102 may store source code 104. In some cases, the source code 104 may be included in any number of files, and may be stored in a source control system such as the Perforce™ revision control system developed by Perforce Software, Inc. of Alameda, Calif., United States. The source code 104 may be written in any programming language. For example, the source code 104 may be written in a compiled programming language such as Java™, C, C++, C#™, Objective-C™, and so forth. The source code 104 may also be written in an interpreted programming language, such as JavaScript™, ActiveScript™, VBScript™, Perl™, and so forth, that is executable within a virtual machine, interpreter, scripting engine, or other process. The source code 104 may describe any number of functions 106. The function(s) 106 may include one or more subroutines, methods, procedures, routines, subprograms, or other callable units of a software module.

The source code 104 may be accessed by one or more build modules 108 that are configured to build a software module 110 based on the source code 104. The build module(s) 108 may include one or more compilers that are configured to compile the source code 104 to generate executable code of the software module 110. The compiler(s) may include any number of sub-modules, including but not limited to preprocessors, parsers, code generators, optimizers, and so forth. In some cases, the build module(s) 108 may be configured to compile the source code 104 and generate machine-executable code (e.g., binary executable(s)) that is executed by one or more processors. Alternatively, the build module(s) 108 may be configured to compile the source code 104 and generate code (e.g., bytecodes) that is executed within a virtual machine, interpreter, runtime, or other process. The build module(s) 108 may also include linkers, preprocessors, parsers, optimizers, build scripts, or other applications that process the source code 104, or files built from the source code 104, to generate the software module 110.

The source code 104 may be included in any number of files, and any number of source code 104 files may be processed to build the software module 110. The software module 110 may include any executable software module, such as an application, executable library, interface, and so forth. The software module 110 may provide any type of functionality, including but not limited to functionality associated with the operations of one or more of a web site, an online business, a social network service, a data processing service, a communications service, an entertainment service, a game, and so forth.

The build module(s) 108 may compile or otherwise process each of the function(s) 106 described in the source code 104 to generate a set of executable instructions 112 comprising the executable function code for the function 106. The build module(s) 108 may also generate, for at least one of the function(s) 106, one or more switching instructions 114. The switching instruction(s) 114 for a function 106 may control the execution of the set of executable instructions 112 for the function 106 based on a value included in control data 116. The set(s) of executable instructions 112 and the switching instruction(s) 114 may be included in the software module 110. The switching instruction(s) 114 may be inserted into the executable code of the software module 110 by the build module(s) 108 even though the source code 104 may not have been written to include any code specifying a conditional execution of the function 106.

Figure 2:
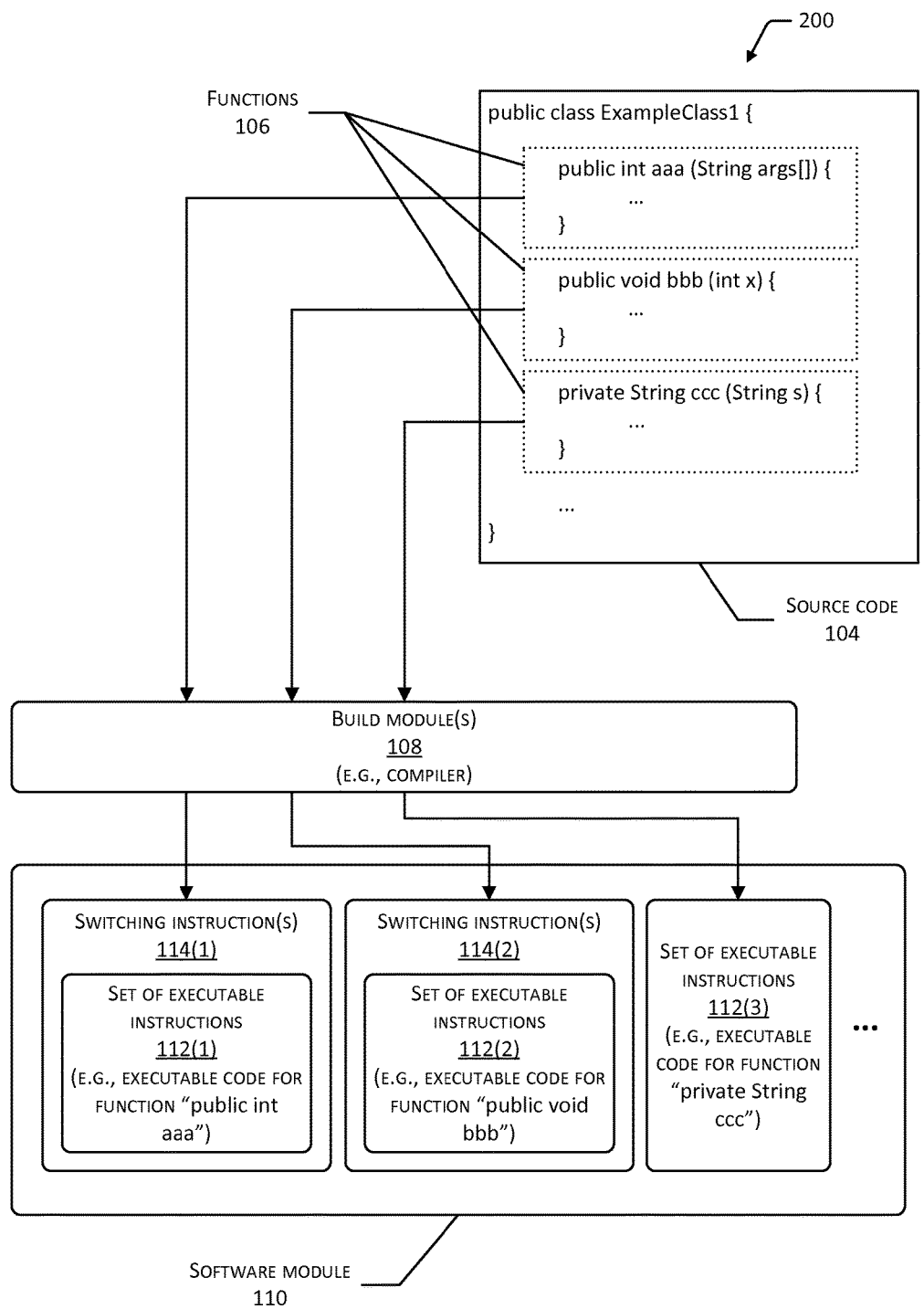
FIG. 2 depicts an example of compiling source code to generate executable code for a software module, including generating switching instruction(s) to dynamically control the execution of portion(s) of the software module.

FIG. 2 depicts an example 200 of compiling or otherwise processing the source code 104 to generate the software module 110. As shown in FIG. 2, the source code 104 may include a description for any number of functions 106. Although the example source code 104 in FIG. 2 is written in Java™, implementations support the use of other programming languages to describe the source code 104. In some implementations, switching instruction(s) 114 may be generated for each of the functions 106 described in the source code 104. Alternatively, the build module(s) 108 may determine whether to generate switching instruction(s) 114 for a function 106 based on various criteria. For example, as shown in the example 200 of FIG. 2, switching instruction(s) 114 may be generated for the public functions 106 described in the source code 104 and may not be generated for the private functions 106. Other characteristics of a function 106 may be employed to determine whether to generate switching instruction(s) 114 for the function 106, such as whether the function 106 is static.

In some implementations, the determination to generate switching instruction(s) 114 for a function 106, and thus implement the switching feature for the function 106, may be based at least partly on a directive included in the source code 104 by a developer, designer, program manager, or other individual(s). For example, the source code 104 may include a directive "#switchable" before the declaration of a function 106 to indicate that switching instruction(s) 114 are to be generated to control the execution of the function 106.

In some cases, the build module(s) 108 may generate switching instruction(s) 114 for function(s) 106 that perform a particular type of functionality. For example, the switching instruction(s) 114 may be generated for functions 106 that are exposed to an end user, that access data (e.g., sensitive or confidential data), that employ credentials to access other systems, that are included in an API to be called from other software modules, and so forth.

Figure 3:
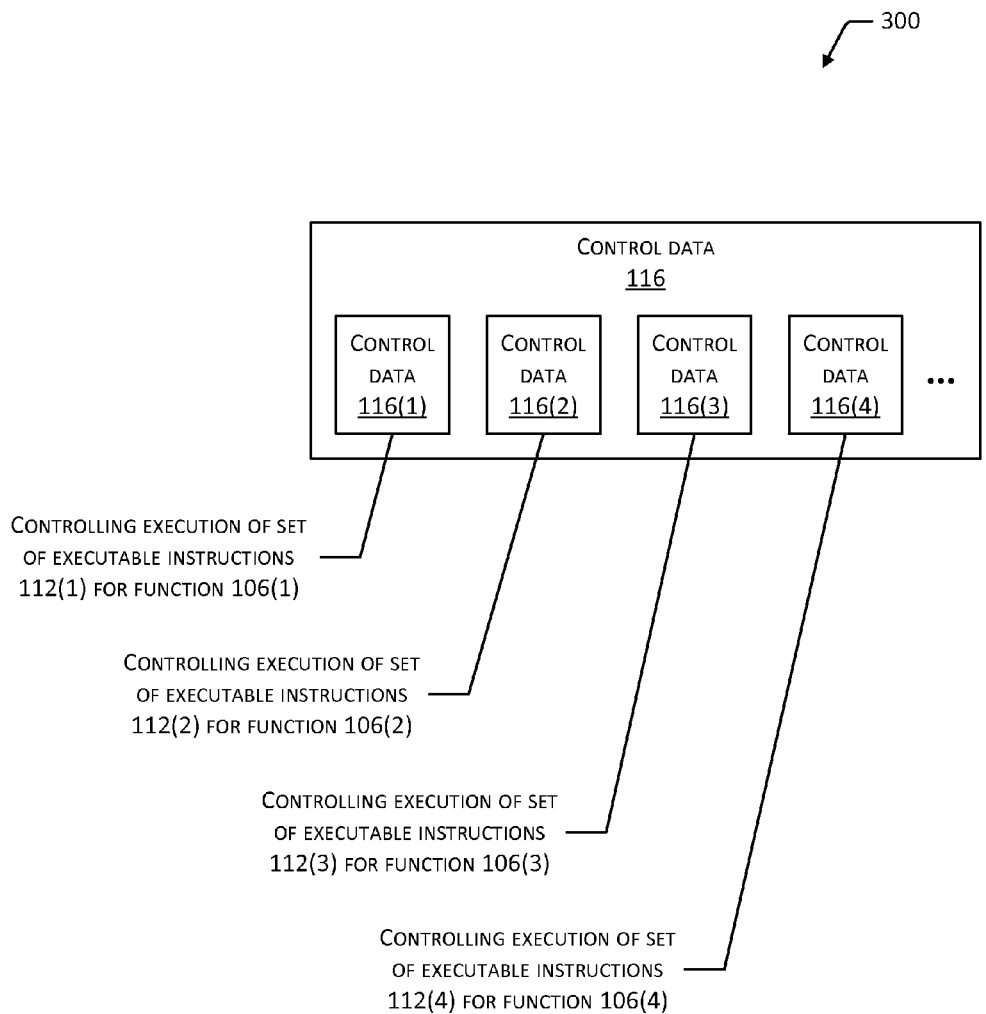
FIG. 3 depicts an example of control data employable to dynamically control the execution of portion(s) of the software module.

FIG. 3 depicts an example 300 of the control data 116 that is employable to dynamically control the execution of set(s) of executable instructions 112 for function(s) 106. As shown in FIG. 3, the control data 116 may include any number of portions (e.g., control data 116(1), control data 116(2), and so forth) that each corresponds to, and controls the execution of, a set of executable instructions 112 for a function 106. The control data 116 may include any size of data in any format. In some implementations, the control data 116 may include an array of bits where each bit controls the execution of a set of executable instructions 112 for a function 106.

In some implementations, the switching instructions 114 may be in the form of a conditional that executes different code paths based on the value of the control data 116 associated with the function 106. For example, if the control data 116 associated with a function 106 is a particular value, the set of executable instructions 112 for the function 106 may be executed. If the control data 116 is a different value, the set of executable instructions 112 for the function 106 may not be executed and instead the switching instructions 114 may emit error information. The error information may be in the form of an error return code, a null return code, an assertion, an exception, or in another form. In some implementations, the emitted error information may indicate that the set of executable instructions 112 for the function 106 was blocked, disabled, or otherwise bypassed via the control data 116, such that a calling process may not misinterpret the error information as a normal return value of the function 106. For example, the error information may include a message "cannot execute function <function-name>".

In implementations where the control data 116 includes an array of bits that each corresponds to a function 106, an "on" bit (e.g., 1) may indicate that the set of executable instructions 112 for the function 106 is to be bypassed and an "off" bit (e.g., 0) may indicate that the set of executable instructions 112 is to be executed. Alternatively, an "off" bit may indicate execution and an "on" bit may indicate bypass.

Returning to FIG. 1, the build server device(s) 102 may execute a deployment module 118 that deploys, or otherwise communicates, the software module 110 to one or more host device(s) 120. The host device(s) 120 may comprise any type of computing device, including but not limited to those types of computing device(s) described with reference to the build server device(s) 102. Although examples herein may describe the host device(s) 120 as physical device(s), implementations are not so limited. In some cases, the host device(s) 120 may include one or more of a virtual computing environment, a hypervisor, an emulation, or a virtual machine executing on one or more physical computing devices. In some cases, two or more of the host devices 120 may comprise a cluster, cloud, farm, or other grouping that coordinates operations to provide load balancing, failover support, parallel processing capabilities, shared storage resources, or other aspects. The host device(s) 120 are described further with reference to FIG. 6.

The host device(s) 120 may execute the software module 110. During the execution of the software module 110, one or more other processes may call the function(s) 106 or other callable portion(s) of the software module 110. In response to each call to a function 106 that has been compiled with the switching feature, the switching instructions 114 may check the current value of the control data 116 associated with the function 106. The switching instruction(s) 114 may execute, or bypass, the set of executable instructions 112 for the function 106 based on the current value of the control data 116 associated with the function 106.

Figure 4:
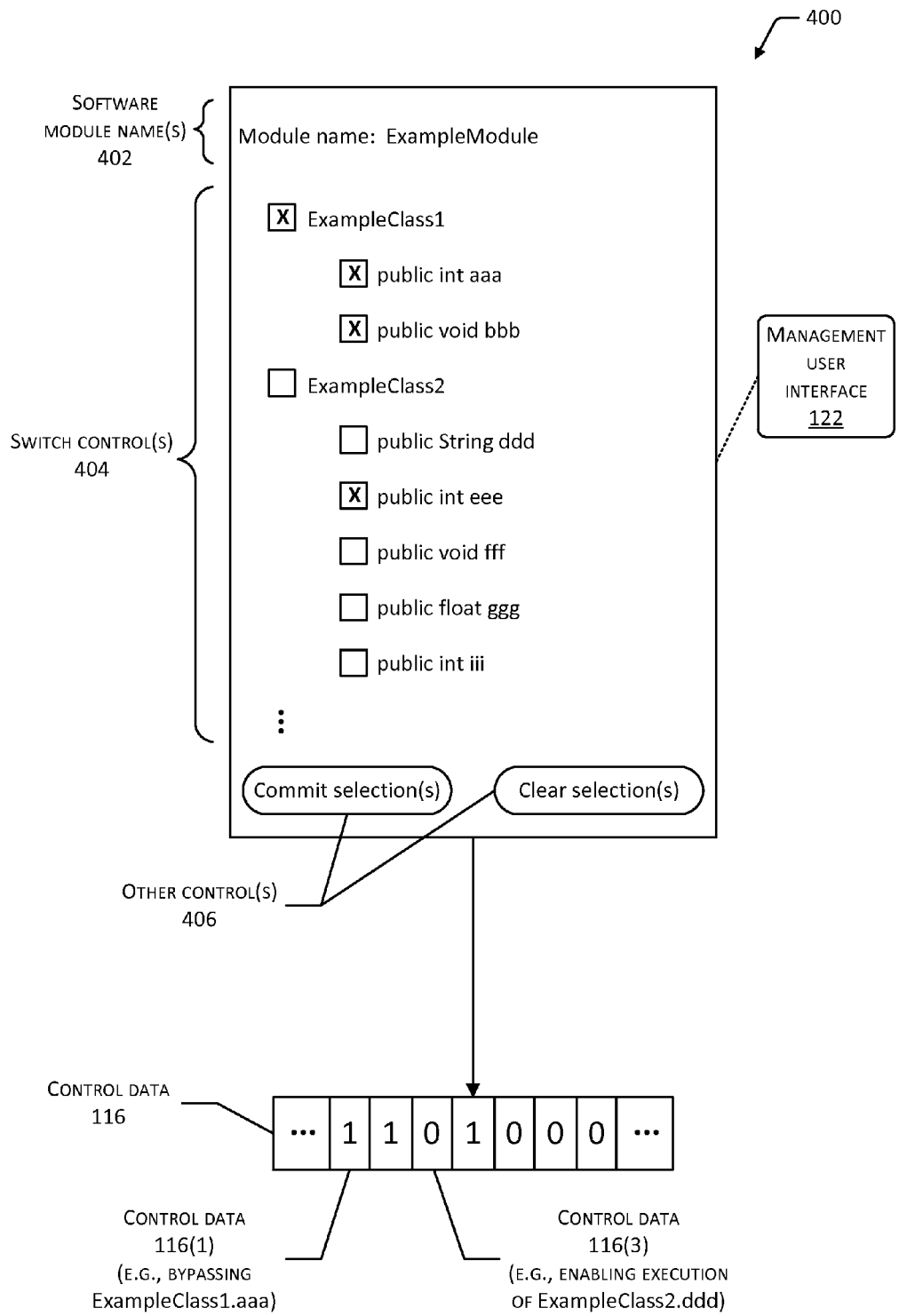
FIG. 4 depicts an example of a management user interface that is employable to set the control data.

In some implementations, the host device(s) 120 or other device(s) may execute a management user interface (UI) 122 that enables an operator or other user to set one or more values of the control data 116 corresponding to one or more switchable functions 106 of one or more software modules 110 that are executable on the host device(s) 120. FIG. 4 depicts an example 400 of the management UI 122 that is employable to set the control data 116. As shown in FIG. 4, the management UI 122 may present one or more software module names 402 identifying the software module(s) 110 that are controllable via the management UI 122.

For each software module 110 that is controllable via the management UI 122, the management UI 122 may present one or more switch controls 404. The switch control(s) 404 may enable a user to select which function(s) 106 of the software module 110 are to be executed and which function(s) 106 are to be bypassed. Accordingly, the switch control(s) 404 may include control(s) for the function(s) 106 that were compiled with the switching feature such that the switching instruction(s) 114 were generated for the function 106.

In some implementations, as shown in the example 400, the switch control(s) 404 for the switchable function(s) 106 may be arranged hierarchically in a manner that may be similar to a call stack of the software module 110. For example, a class-level switch control 404 may be included for a class or an object of the software module 110, and one or more child switch control(s) 404 may be presented under the class-level switch control 404 corresponding to switchable function(s) 106 that are member(s) of the class or object. Selection of the class-level switch control 404 may automatically cause the selection of the child switch control(s) 404 under the class-level switch control 404, as shown in FIG. 4 with the selection of "ExampleClass1".

The management UI 122 may also include one or more other controls 406. For example, the management UI 122 may include a control to enable the user to commit the selection(s) or de-selection(s) made using the switch control(s) 404. The user's operation of such a control may cause changes to the control data 116 corresponding to the selection(s) or de-selection(s). For example, as shown in FIG. 4, committing the current selection(s) may cause binary data to be written to the control data 116, with the "on" bits corresponding to the function(s) 106 selected for bypass. The other control(s) 406 may also include a control to clear the current selection(s) in the switch control(s) 404.

Returning to FIG. 1, in some implementations the host device(s) 120 may include a management API 124. Other software modules (e.g., applications, libraries, etc.) may call one or more methods that are exported, exposed, or otherwise provided by the management API 124 to change the control data 116 and cause one or more functions 106 to be switched on or off. Accordingly, implementations enable the programmatic control of the execution of the switchable function(s) 106.

Some implementations may employ various acceleration techniques to mitigate potentially negative performance effects of checking the control data 116 in response to multiple function calls. For example, various hardware acceleration techniques may be employed to increase the speed at which the switching instruction(s) 114 are executed to check the value(s) of the control data 116. In some cases, the control data 116 may be stored in memory that may be more rapidly accessed than other memory, such as one or more of a processor register, random access memory (RAM), solid state memory, content-addressable memory (CAM), and so forth. Moreover, some implementations may enable the switching feature to be disabled on one or more host device(s) 120, or for one or more software modules 110, through the setting of an environment variable or by other means.

Although FIG. 1 depicts the control data 116 as separate from the software module 110, implementations are not so limited. In some cases, the control data 116 may be in the runtime (e.g., active) memory of the executing software module 110 or in the runtime memory of a virtual machine executing the software module 110. In some implementations, access to the control data 116 may be secure such that authenticated users are provided with the ability to read or alter the control data 116. In such cases, the management UI 122 may be accessible to a user based on verification of the user's identify, based on authentication of user-provided credentials, or through other means.

In some implementations, the control data 116 may be included in a section, block, or other portion of the software module 110. The control data 116 may be secured against unauthorized access, through encryption or other means. In some implementations, the build module(s) 108 may generate the control data 116 with default (e.g., switched on) values for each of the function(s) 106, and the control data 116 may be deployed to the host device(s) 120 with the software module 110.

In some implementations, the build module(s) 108 or another process may generate control data metadata 126 that indicates which portions of the control data 116 correspond to which functions 106. The control data metadata 126 may describe, for each of the switchable function(s) 106, a mapping or other association between the name or other identifier of the function 106 and the portion of the control data 116 that corresponds to the function 106. In some implementations, the control data metadata 126 may describe the portions of the control data 116 as a bit number or an offset of each portion from the beginning of the control data 116. The control data metadata 126 may be employed to determine the switch control(s) 404 to be presented in the management UI 122. The control data metadata 126 may also be employed by the switching instruction(s) 114, or other module(s), to determine which function(s) 106 to switch on or off based on the values of the control data 116 when the software module 110 executes.

Although examples herein may describe generating the switching instruction(s) 114 at build time, such as during the compiling or linking of the source code 104, implementations are not so limited. In some implementations, the switching instruction(s) 114 may be incorporated into the software module 110 after the software module 110 is built, such as through a binary patch of the software module 110. In some cases, the switching instruction(s) 114 may be injected, patched, or otherwise incorporated into the software module 110 during the execution of the software module 110, as described further with reference to FIG. 6.

Figure 5:
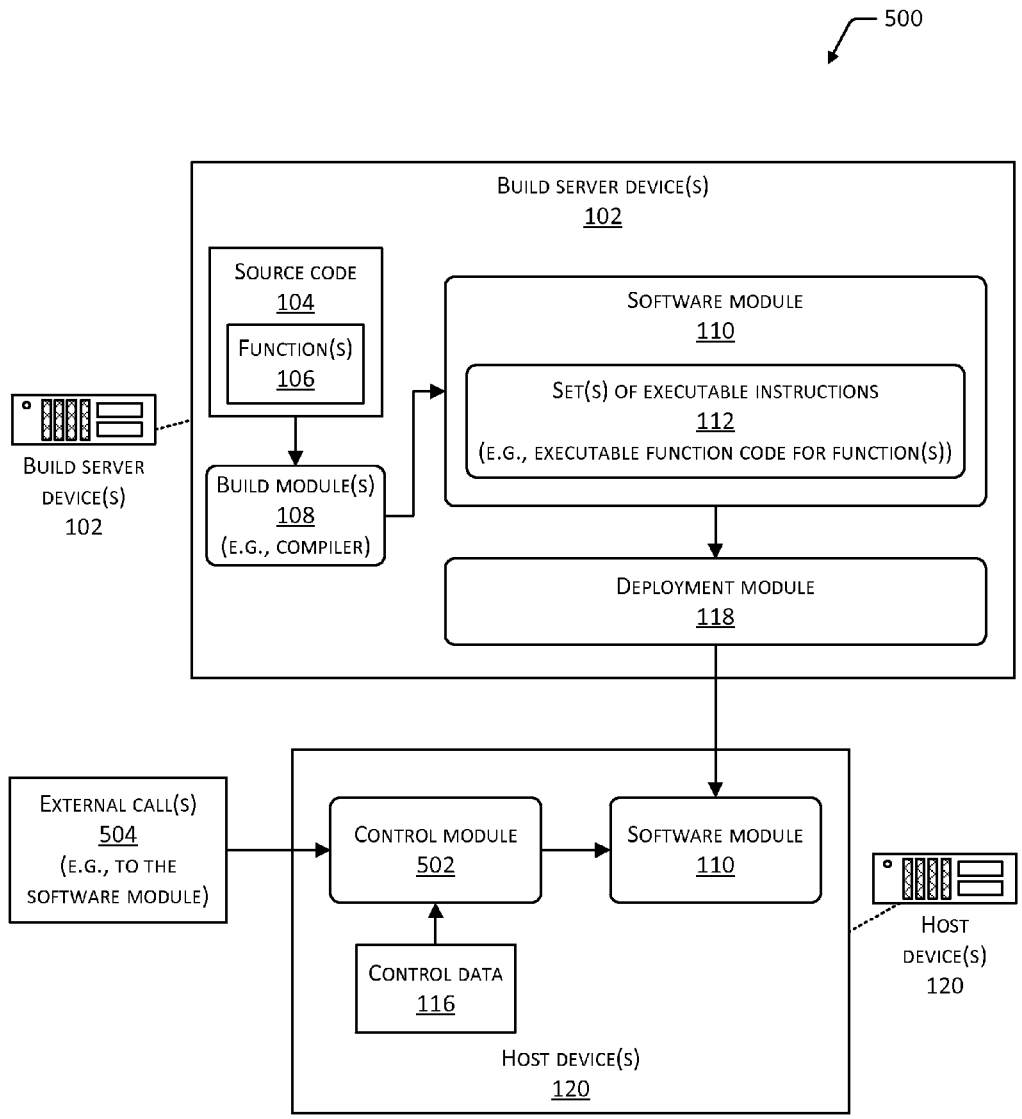
FIG. 5 depicts an environment for dynamic switching of portion(s) (e.g., function(s)) of an executable software module based on control data, through the monitoring of (e.g., external) calls to the software module.

FIG. 5 depicts an environment 500 for dynamic switching of one or more functions 106 or other portion(s) of an executable software module 110 based on the control data 116, through the monitoring of (e.g., external) calls to the software module 110. The elements depicted in FIG. 5 may be configured similarly, or may operate similarly, to like-numbered elements depicted in FIG. 1.

As shown in FIG. 5, in some implementations the software module 110 may be built on the build server device(s) 102 to include the set(s) of executable instructions 112 for the function(s) 106, but not to include the switching instruction(s) 114 that control execution of the set(s) of executable instructions 112. The built software module 110 may be deployed to the host device(s) 120. The host device(s) 120 may execute a control module 502. The control module 502 may be configured to monitor network communications to and from the host device(s) 120 or communications that are internal to the host device(s) 120.

In some implementations, the software module 110 may be an API, a service, or another type of module that exposes one or more functions 106 that are callable from processes executing externally with respect to the host device(s) 120. The control module 502 may detect one or more external calls 504 made to the software module 110 by one or more external calling processes over a network. Based on packet inspection or other methods, the control module 502 may determine that the external call 504 is to a set of executable instructions 112 for a function 106 of the software module 110. The control module 502 may access the control data 116 to determine whether the external call 504 is to be allowed to proceed. If the control data 116 indicates that the function 106 is to be bypassed, the control module 502 may block the external call 504. In some cases, the control module 502 may return error information indicating that the external call 504 is blocked. Alternatively, the control module 502 may return decoy data to the calling process, to mislead or disrupt a potential attacker. In some cases, the control module 502 may execute within a load balancer, router, or other network appliance to monitor and control the external call(s) 504 into the software module 110.

Figure 6:
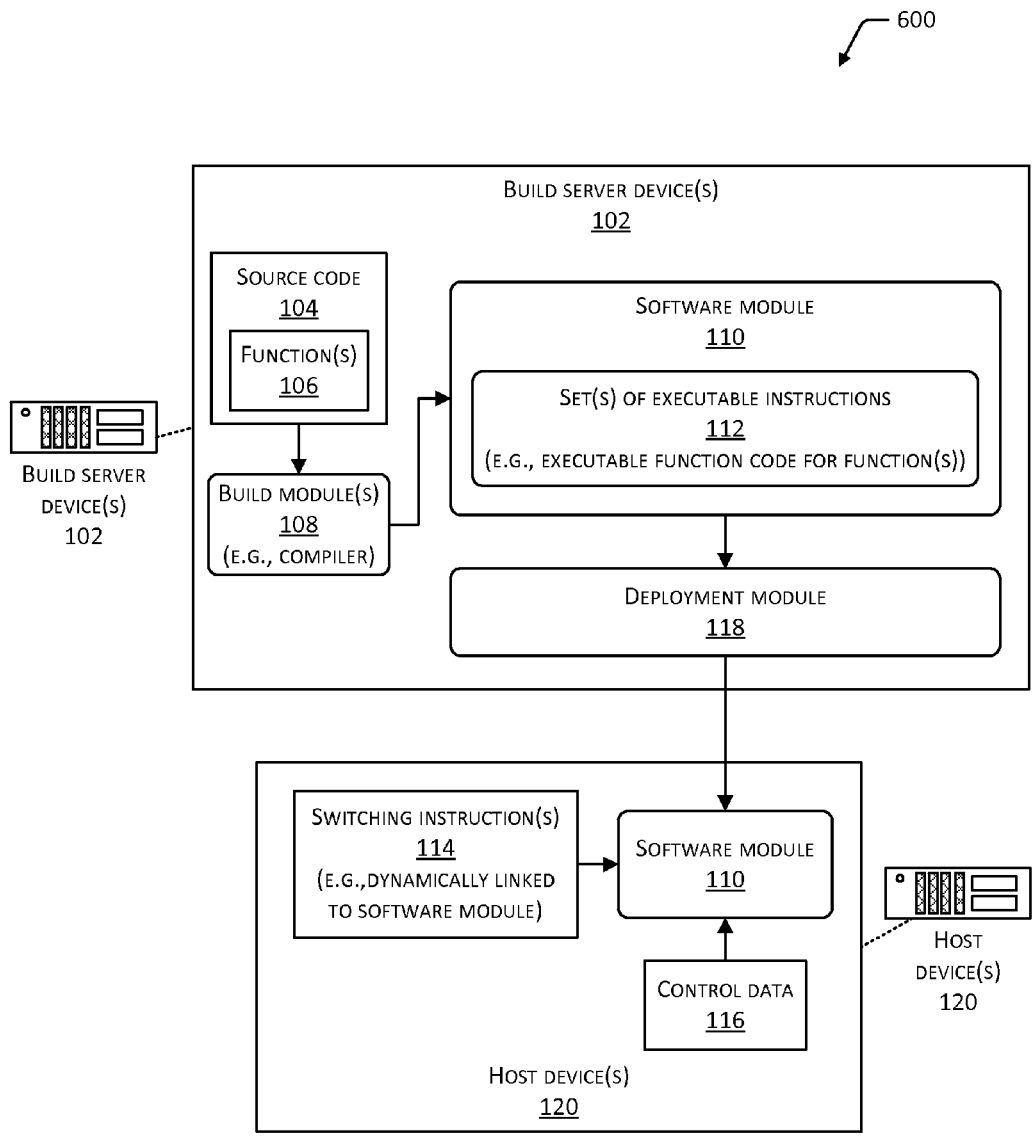
FIG. 6 depicts an environment for dynamic switching of portion(s) (e.g., function(s)) of an executable software module based on control data, in which switching instruction(s) are dynamically incorporated into the software module after the software module is built.

FIG. 6 depicts an environment 600 for dynamic switching of one or more functions 106 or other portion(s) of an executable software module 110 based on the control data 116. In the example of FIG. 6, the switching instruction(s) 114 are dynamically incorporated into the software module 110 after the software module 110 is built. The elements depicted in FIG. 6 may be configured similarly, or may operate similarly, to like-numbered elements depicted in FIG. 1.

As shown in FIG. 6, in some implementations the software module 110 may be built on the build server device(s) 102 to include the set(s) of executable instructions 112 for the function(s) 106, but not to include the switching instruction(s) 114 that control execution of the set(s) of executable instructions 112. The built software module 110 may be deployed to the host device(s) 120. When the software module 110 executes on the host device(s) 120, the switching instruction(s) 114 may be dynamically linked, patched, or otherwise incorporated into the executing software module 110. For example, the dynamic incorporation may map the entry point of a function 106 to a return instruction that emits error information or decoy data instead of pointing to the set of executable instructions 112 for the function 106. The dynamic incorporation of the switching instruction(s) 114 may be performed conditionally based on a value of the control data 116 for the function 106 at runtime.

The various devices of the environments 100, 500, and 600 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g. 3G, 4G, etc.), and so forth. In some implementations, the communications between the various devices in the environments 100, 500, and 600 may be encrypted or otherwise secured. For example, such communications may employ one or more public or private cryptographic keys, ciphers, digital certificates, or other credentials supported by a security protocol, such as any version of the Secure Sockets Layer (SSL) or the Transport Layer Security (TLS) protocol.

Figure 7:
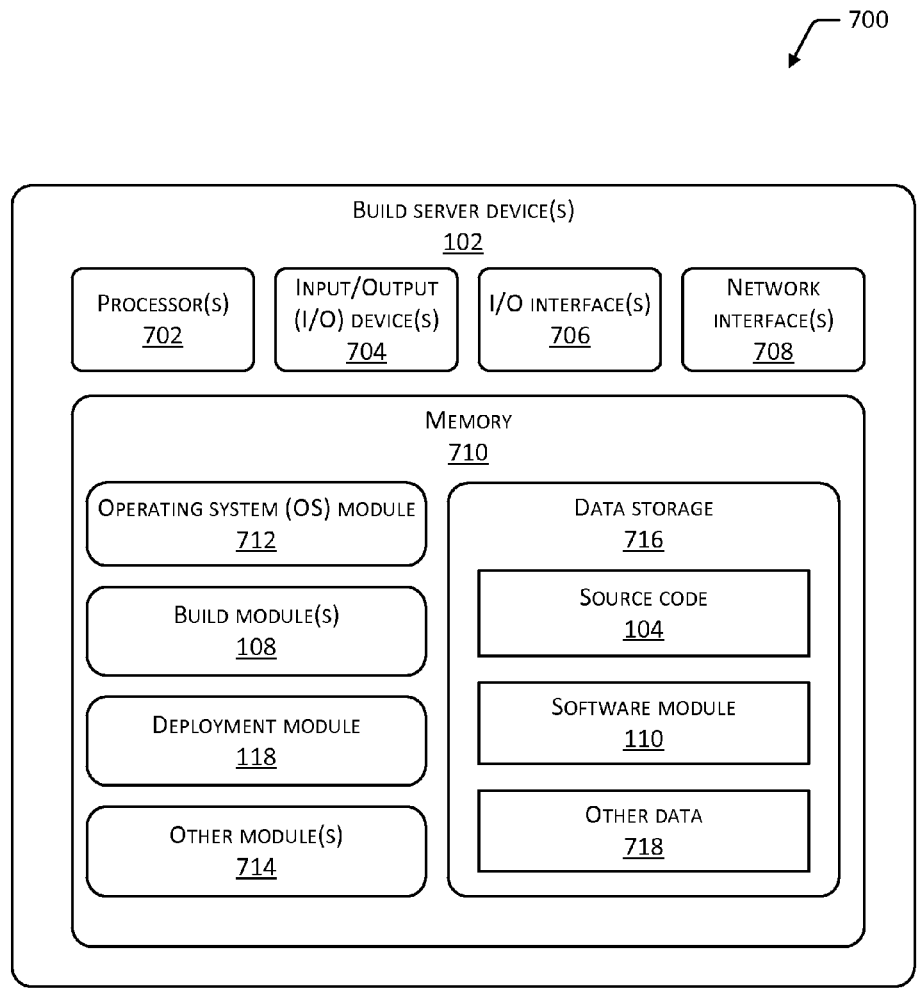
FIG. 7 depicts a block diagram of an example of build server device(s) configured to generate executable code that includes switching instruction(s) to dynamically control the execution of portion(s) of the software module.

FIG. 7 depicts a block diagram 700 of an example of the build server device(s) 102. As shown in the block diagram 700, the build server device(s) 102 may include one or more processors 702 configured to execute one or more stored instructions. The processor(s) 702 may include hardware-based processor(s) 702, and may comprise one or more cores.

The build server device(s) 102 may include one or more input/output (I/O) devices 704. The I/O device(s) 704 may include one or more input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 704 may also include one or more output devices such as a display, an audio output device (e.g., a speaker), a printer, a haptic output device, and so forth. The I/O device(s) 704 may be physically incorporated with the build server device(s) 102 or may be externally placed.

The build server device(s) 102 may include one or more I/O interfaces 706 to enable components or modules of the build server device(s) 102 to control, interface with, or otherwise communicate with the I/O device(s) 704. The I/O interface(s) 706 may enable information to be transferred in or out of the build server device(s) 102 or between components of the build server device(s) 102, through serial communication, parallel communication, or other types of communication. For example, the I/O interface(s) 706 may comply with a version of the RS-232 standard for serial ports, or with a version of the Institute of Electrical and Electronics Engineers (IEEE) 1284 standard for parallel ports. As another example, the I/O interface(s) 706 may be configured to provide a connection over Universal Serial Bus (USB) or Ethernet. In some cases, the I/O interface(s) 706 may be configured to provide a serial connection that is compliant with a version of the IEEE 1394 standard. The build server device(s) 102 may also include one or more busses or other internal communications hardware or software that enables the transfer of data between the various modules and components of the build server device(s) 102.

The build server device(s) 102 may include one or more network interfaces 708 that enable communications between the build server device(s) 102 and other network accessible computing devices, such as the host device(s) 120. The network interface(s) 708 may include one or more network interface controllers (NICs) or other types of transceiver devices configured to send and receive communications over one or more networks.

The build server device(s) 102 may include one or more memories, described herein as memory 710. The memory 710 comprises one or more computer-readable storage media (CRSM). The CRSM may include one or more of an electronic storage medium, a magnetic storage medium, an optical storage medium, a quantum storage medium, a mechanical computer storage medium, and so forth. The memory 710 provides storage of computer-readable instructions describing data structures, program modules, processes, applications, or other data for the operation of the build server device(s) 102. In some implementations, the memory 710 may provide storage of computer-readable instructions or other information in a non-transitory format.

The memory 710 may include an operating system (OS) module 712. The OS module 712 may be configured to manage hardware resources such as the I/O device(s) 704, the I/O interface(s) 706, and the network interface(s) 708. The OS module 712 may also be configured to provide various services to applications, processes, or modules executed by the processor(s) 702. The OS module 712 may include one or more of the following: any version of the Linux™ OS; any version of iOS™ from Apple Corp. of Cupertino, Calif., USA; any version of Windows™ or Windows Mobile™ from Microsoft Corp. of Redmond, Wash., USA; any version of Android™ from Google Corp. of Mountain View, Calif., USA and its derivatives from various sources; any version of Palm OS™ from Palm Computing, Inc. of Sunnyvale, Calif., USA and its derivatives from various sources; any version of BlackBerry OS™ from Research In Motion Ltd. of Waterloo, Ontario, Canada; any version of VxWorks™ from Wind River Systems of Alameda, Calif., USA; or other operating systems.

The memory 710 may include one or more of the modules described above as executing on the build server device(s) 102, such as the build module(s) 108 or the deployment module 118. The memory 710 may also include one or more other modules 714, such as a user authentication module or an access control module to secure access to the build server device(s) 102, source control module(s), version control module(s), and so forth.

The memory 710 may include, or have access to, data storage 716 which stores data for operations of the build server device(s) 102. The data storage 716 may comprise a file system, database, array, structured list, tree, or other data structure, and may be a relational or a non-relational datastore. The data storage 716 may store any of the information described above as being present on the build server device(s) 102, including but not limited to the source code 104 or the executable code of the software module 110. The data storage 716 may also store other data 718 such as user authentication information, access control data, source control information, version control information, build status information, or other information. In some implementations, at least a portion of the information stored in the data storage 716 may be stored externally to the build server device(s) 102, on other devices that may communicate with the build server device(s) 102 via the I/O interface(s) 706 or via the network interface(s) 708.

Figure 8:
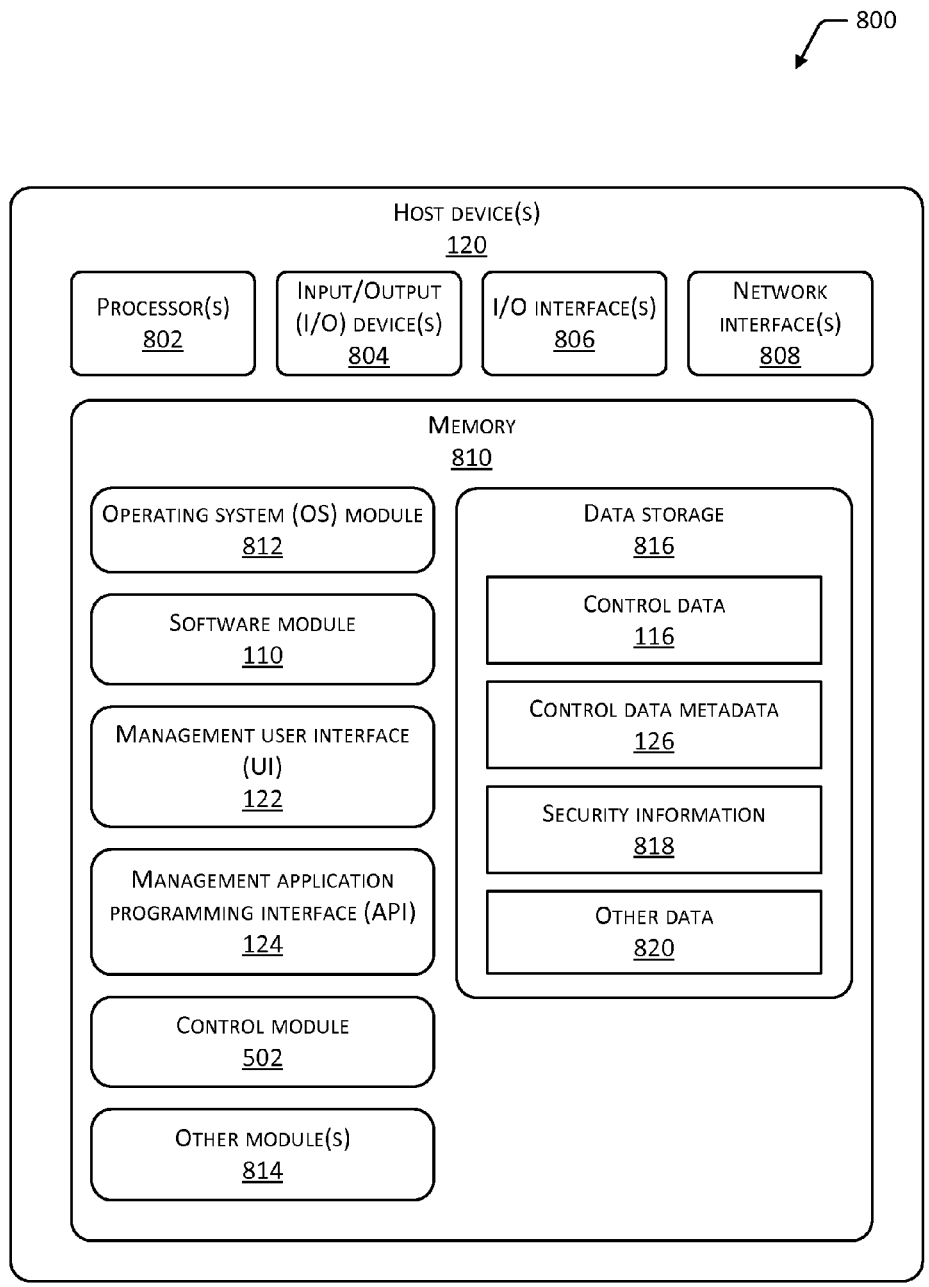
FIG. 8 depicts a block diagram of an example of host device(s) configured to execute the software module.

FIG. 8 depicts a block diagram 800 of an example of the host device(s) 120. As shown in the block diagram 800, the host device(s) 120 may include one or more processors 802 (e.g., hardware-based processor(s)) configured to execute one or more stored instructions. The processor(s) 802 may comprise one or more cores. The host device(s) 120 may include one or more I/O devices 804, one or more I/O interfaces 806, and one or more network interfaces 808 as described above respectively with reference to the I/O device(s) 704, the I/O interface(s) 706, and the network interface(s) 708.

The host device(s) 120 may include one or more memories, described herein as memory 810. The memory 810 comprises one or more CRSM, as described above with reference to the memory 710. The memory 810 may include an OS module 812 that is configured to manage hardware resources such as the I/O device(s) 804, the I/O interface(s) 806, and the network interface(s) 808, and to provide various services to applications, processes, or modules executing on the processor(s) 802. The OS module 812 may include one or more of the operating systems described above with reference to the OS module 712.

The memory 810 may include one or more of the modules described above as executing on the host device(s) 120, such as the software module 110, the management UI 122, the management API 124, or the control module 502. The memory 810 may also include one or more other modules 814, such as a user authentication module or an access control module to secure access to the host device(s) 120, and so forth.

The memory 810 may include the data storage 816, which may store data for operations of the host device(s) 120. The data storage 816 may comprise a database, array, structured list, tree, or other data structure, and may be a relational or a non-relational datastore. The data storage 816 may store data such as that described above as present on the host device(s) 120, including one or more of the control data 116 or the control data metadata 126. In some implementations, the data storage 816 may include store security information 818 that describes one or more security vulnerabilities determined to be present in the software module(s) 110.

Such security information 818 may be employed to determine whether to disable the execution of one or more functions 106 of the software module(s) 110 to mitigate the risk due to the security vulnerabilities. The data storage 816 may also store other data 820, such as user authentication information or access control data. In some implementations, at least a portion of the information stored in the data storage 816 may be stored externally to the host device(s) 120 on other devices that may communicate with the host device(s) 120 via the I/O interface(s) 806 or via the network interface(s) 808.

Figure 9:
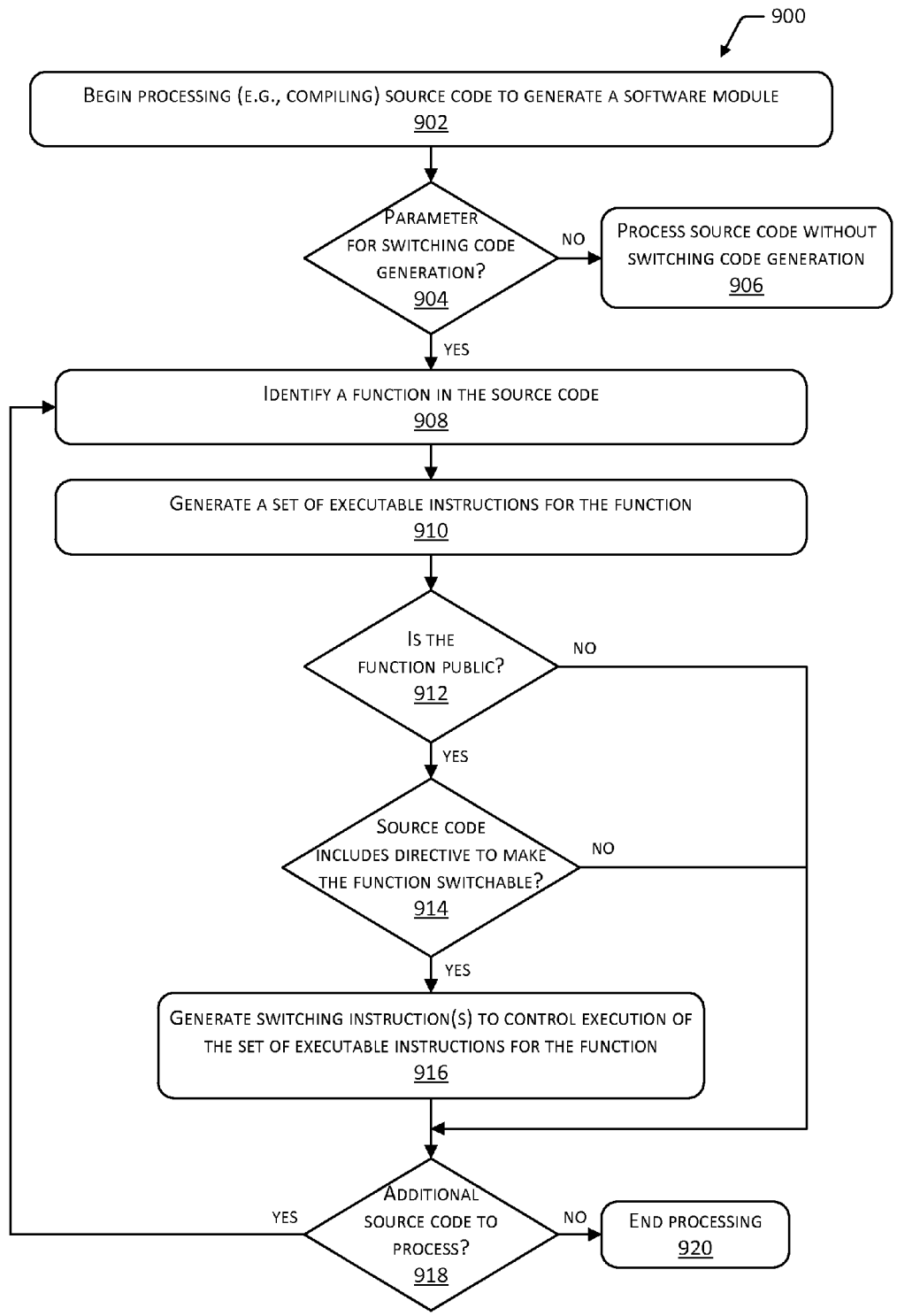
FIG. 9 depicts a flow diagram of a process for compiling source code to generate executable code that includes switching instruction(s) to dynamically control the execution of portion(s) of the software module.

FIG. 9 depicts a flow diagram 900 of a process for compiling or otherwise processing the source code 104 to generate the software module 110. Operations of the process may be performed by one or more of the build module(s) 108, the other module(s) 714 executing on the build server device(s) 102, or other modules executing on other device(s).

At 902, the compiling or other processing of the source code 104 to generate the software module 110 may begin. In some implementations, the build module(s) 108 may be configured to accept an input parameter indicating that the switching feature is to be included for one or more functions 106 of the generated executable code. For example, a compiler may be configured to accept a command line parameter indicating that all function(s) 106 are to be switchable, e.g., "compile.exe—switchable all". As another example, a compiler may be configured to accept a command line parameter that indicates particular function(s) 106 (e.g., public functions) are to be switchable, e.g., "compile.exe—switchable public".

In implementations where the switching feature is activated in the build module(s) 108 based on an input parameter, at 904 a determination may be made whether the parameter has been set. If not, the process may proceed to 906 and process (e.g., compile) the source code 104 without generating the switching instruction(s) 114 for any function(s) 106. For example, in cases where the software module 110 is to execute in a trusted environment, a controlled environment, or an environment that is not connected to network(s), the software module 110 may be built without the switching feature. If it is determined at 904 that the input parameter has been set to activate the switching feature, the process may proceed to 908.

At 908, the build module(s) 108 may parse or otherwise analyze the source code 104 to identify a function 106 in the source code 104. At 910, the set of executable instructions 112 may be generated which, when executed, perform the function 106.

In some implementations certain types of functions 106, such as public functions, may be made switchable in the software module 110. In such implementations, at 912 a determination may be made whether the function 106 is of a type (e.g., public) that is to be switchable. If not, the process may proceed to 918. If so, the process may proceed to 914. The determination of the type of the function 106, or other characteristics of the function 106, may be made by parsing the source code 104 that describes the function 106. For example, the source code 104 may be parsed to identify the keyword "public" that is included, using a syntax appropriate to the programming language, to indicate that the function 106 is public.

In some implementations, the build module(s) 108 may make a function 106 switchable based at least partly on a directive included in the source code 104, as described above. In such implementations, at 914 a determination is made whether the directive is present relative to the description of the function 106 in the source code 104. If not, the process may proceed to 918. If so, the process may proceed to 916.

At 916, the switching instruction(s) 114 may be generated to control the execution of the set of executable instructions 112 generated at 910 for the function 106.

At 918, a determination is made whether there is additional source code 104 to process (e.g., during compilation). If so, the process may return to 908 and identify another function 106 in the source code 104 to be compiled or otherwise processed. If not, the process may end processing at 920.

Although the example of FIG. 9 depicts the switching feature being implemented for a function 106 if the function 106 is a certain type (e.g., public) and the source code 104 includes a directive, implementations are not limited to this example. Some implementations may not provide for the use of a directive to indicate the switching feature for a function 106. Moreover, in some implementations the directive may be employed to override the determination at 912, such as to indicate that the switching feature is to be included for non-public (e.g., private) function(s) 106.

Implementations also support the use of other criteria to determine which functions 106 are to be made switchable in the software module 110. In some cases, the switching instruction(s) 114 may be generated for those function(s) 106 that provide a particular type of functionality. For example, the switching feature may be enabled for the function(s) 106 that provide user-facing, user-visible, or client-exposed features of the software module 110. In some cases, the switching instruction(s) 114 may be generated for those function(s) 106 that are vulnerable to being attacked or otherwise compromised by malicious processes or individuals.

Figure 10:
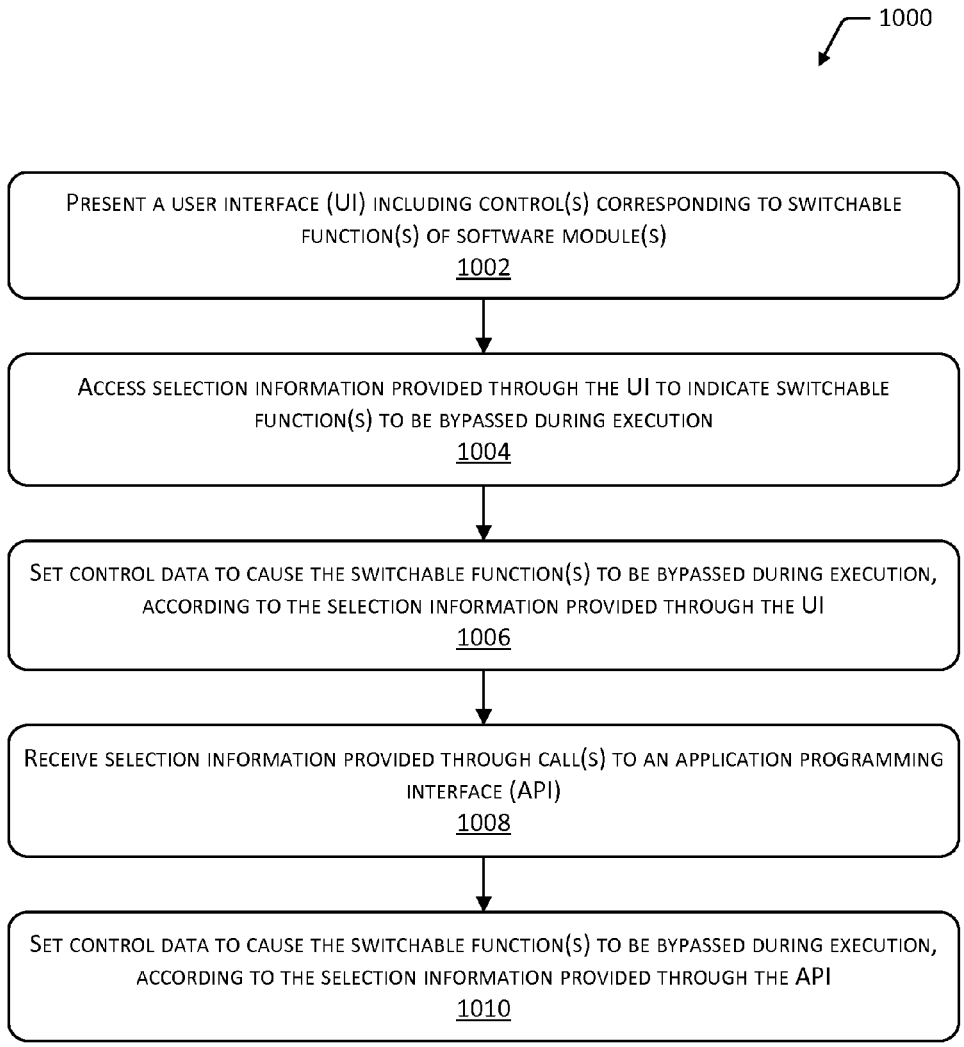
FIG. 10 depicts a flow diagram of a process for determining control data to dynamically control the execution of portion(s) of the software module.

FIG. 10 depicts a flow diagram 1000 of a process for determining the control data 116 to dynamically control the execution of portion(s) of the software module 110. Operations of the process may be performed by one or more of the management UI 122, the management API 124, the other module(s) 814 executing on the host device(s) 120, or other modules executing on other device(s).

At 1002, the management UI 122 is presented. As described with reference to FIG. 4, the management UI 122 may include one or more switch controls 404 corresponding to switchable functions 106 of one or more software modules 110.

At 1004, selection information provided through the management UI 122 may be accessed. The selection information may be provided by a user through the switch control(s) 404 of the management UI 122 to indicate one or more switchable functions 106 to be bypassed (e.g., not executed) during execution of the software module 110.

At 1006, the control data 116 may be determined based on the selection information provided through the management UI 122, to cause the selected switchable function(s) 106 to be bypassed during the execution of the software module 110.

At 1008, selection information may be received through one or more calls into the management API 124 by other modules such as applications, libraries, and so forth.

At 1010, the control data 116 may be determined based on the selection information provided through the management API 124, to cause the selected switchable function(s) 106 to be bypassed during the execution of the software module 110. Implementations support the determination of the control data 116 through selection information provided via the management UI 122, the management API 124, or both the management UI 122 and the management API 124.

Implementations also support other methods for determining the control data 116. For example, the control data 116 may be determined automatically to switch off the execution of one or more functions 106 based on a determination that the security information 818 indicates potential security vulnerabilities in the function(s) 106. Implementations also support the specification of the control data 116 by a user through data entry methods other than the management UI 122.

Figure 11:
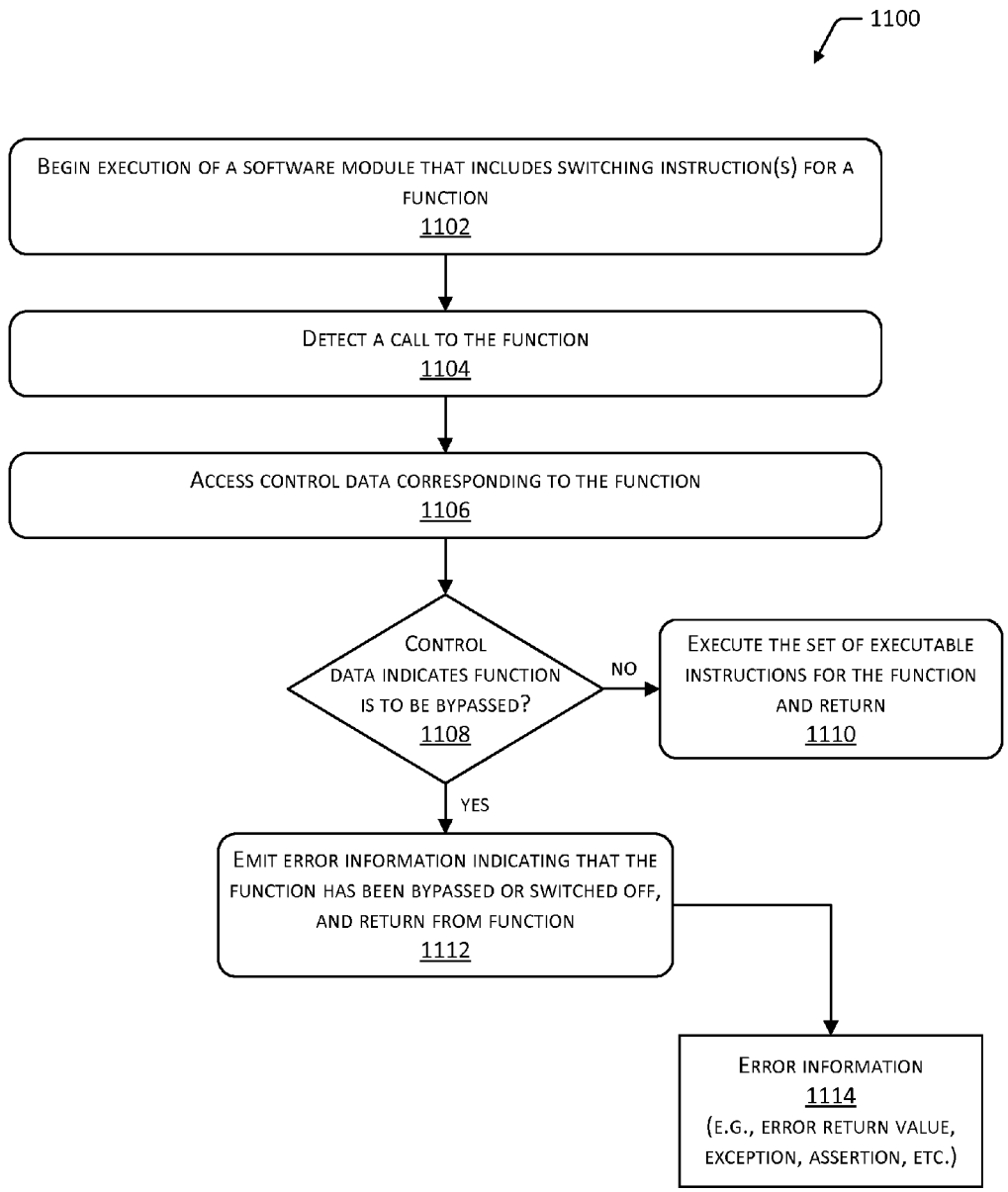
FIG. 11 depicts a flow diagram of a process for executing the software module, including employing the control data to determine whether portion(s) of the software module are to be executed or bypassed.

FIG. 11 depicts a flow diagram 1100 of a process for controlling the execution of the software module 110 based on the control data 116. Operations of the process may be performed by one or more of the software module 110, the control module 502, the other module(s) 814 executing on the host device(s) 120, or other modules executing on other device(s).

At 1102, the software module 110 may begin executing on the host device(s) 120. As described above, the software module 110 may have been built to include switching instruction(s) 114 for one or more functions 106.

At 1104, a call to a function 106 from a calling process may be detected. The switching instruction(s) 114 may be executed to trap and handle the call. The calling process may be external to the software module 110. In some cases, the call may come from another portion of the software module 110.

At 1106, the control data 116 corresponding to the function 106 may be accessed by the switching instruction(s) 114. At 1108, a determination is made whether the control data 116 indicates that the function 106 is to be bypassed (e.g., not executed). If not, the process may proceed to 1110 and the set of executable instructions 112 for the function 106 may be executed. The function 106 may then return (e.g., return execution of the program to a calling function, routine, or process).

If the control data 116 indicates that the function 106 is to be bypassed or otherwise not executed, the process may proceed to 1112. At 1112, error information 1114 may be emitted by the switching instruction(s) 114 to indicate, to the calling process, that the function 106 has been bypassed, switched off, or is otherwise not executable. The function 106 may then return. The error information 1114 may comprise a return value such as an error code or a null value. The error information 1114 may also comprise an exception or an assertion that may be caught and processed by the calling process. In some cases, the error information 1114 may include a description to indicate that the function 106 has been bypassed. For example, the error information 1114 may include a text description "cannot execute function <function-name>", where <function-name> is a name or other identifier of the function 106 that is bypassed.

Although the examples herein may describe the switching off, or switching on, of functions 106 in the software module 110, implementations are not so limited. Implementations may also be employed to enable any portion of the software module 110 to be switched off or on based on the control data 116. For example, a block of the source code 104, including any number of lines of code in any position, may be compiled or otherwise processed to be switchable at runtime. Switching may also be implemented for a class, object, interface, data structure, or other portion of the source code 104.

Moreover, although the examples herein may describe using the switching feature to disable potentially vulnerable portion(s) of a software module 110, implementations may also be employed in other situations. For example, portion(s) of a software module 110 may be switched on or off to enable or disable particular features of the software module 110 absent any security vulnerabilities. Implementations also enable portion(s) of a software module 110 to be switched on or off to affect the performance of the software module 110 or the host device(s) 120 on which it executes, to enable or disable logging features, and for other purposes.

Figure 12:
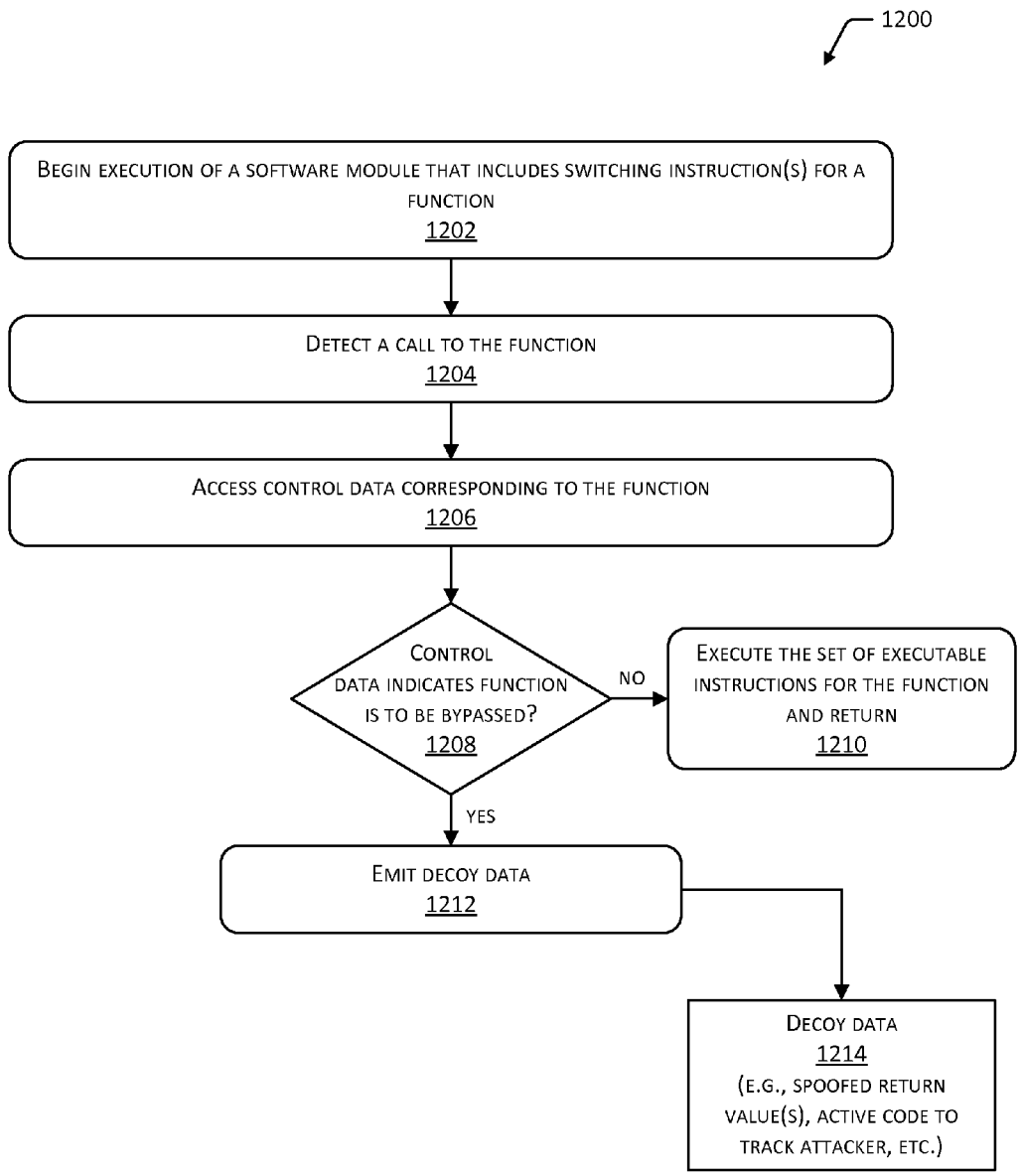
FIG. 12 depicts a flow diagram of a process for executing the software module, including employing the control data to determine whether portion(s) of the software module are to be executed or bypassed, and further including emitting decoy data to mislead a potential attacker.

FIG. 12 depicts a flow diagram 1200 of a process for executing the software module 110. Operations of the process may be performed by one or more of the software module 110, the control module 502, the other module(s) 814 executing on the host device(s) 120, or other modules executing on other device(s).

At 1202, the software module 110 may begin executing on the host device(s) 120. As described above, the software module 110 may have been built to include switching instruction(s) 114 for one or more functions 106.

At 1204, a call to a function 106 from a calling process may be detected. The switching instruction(s) 114 may be executed to trap and handle the call. The calling process may be external to the software module 110. In some cases, the call may come from another portion of the software module 110.

At 1206, the control data 116 corresponding to the function 106 may be accessed by the switching instruction(s) 114. At 1208, a determination is made whether the control data 116 indicates that the function 106 is to be bypassed (e.g., not executed). If not, the process may proceed to 1210 and the set of executable instructions 112 for the function 106 may be executed. The function 106 may then return.

If the control data 116 indicates that the function 106 is to be bypassed or otherwise not executed, the process may proceed to 1212. At 1212, decoy data 1214 may be emitted. In some cases, the decoy data 1214 may be a spoofed return value that is returned as if it were a (e.g., normal or programmed) return value of the function 106. The decoy data 1214 may be configured to mislead, misdirect, or otherwise interfere with the activities of a possible attacker attempting to compromise the software module 110 or the host device(s) 120. In some cases, the decoy data 1214 may include active (e.g., executable) code that executes on an attacker's system to track a location or other information regarding the attacker. In some implementations, the decoy data 1214 may be configured as described in U.S. patent application Ser. No. 14/227,845 filed on Mar. 27, 2014, titled "Identifying Data Usage Via Active Data," which is incorporated by reference into the present disclosure.

Figure 13:
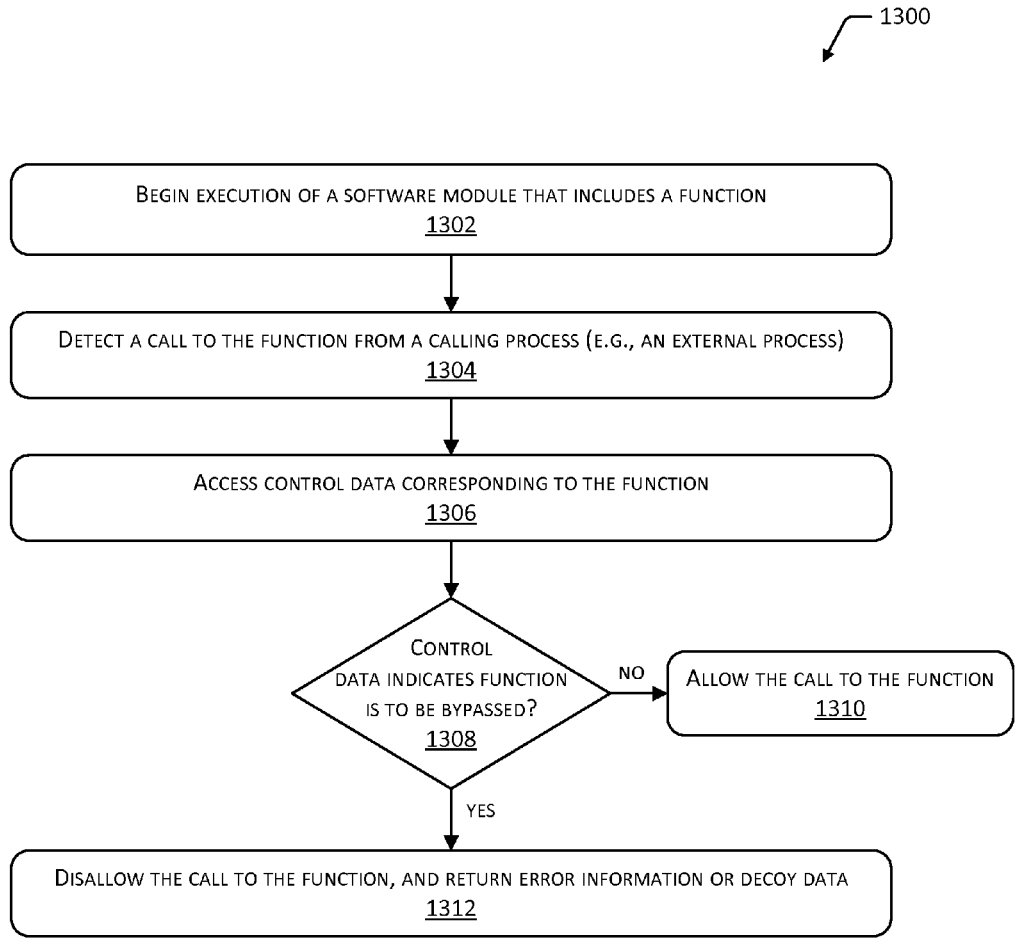
FIG. 13 depicts a flow diagram of a process for dynamic switching of portion(s) (e.g., function(s)) of an executable software module based on control data, through the monitoring of (e.g., external) calls to the software module.

FIG. 13 depicts a flow diagram 1300 of a process for dynamic switching of portion(s) (e.g., function(s)) of an executable software module 110 based on the control data 116. Operations of the process may be performed by one or more of the software module 110, the control module 502, the other module(s) 814 executing on the host device(s) 120, or other modules executing on other device(s).

At 1302, the software module 110 may begin executing on the host device(s) 120. As described above with reference to FIG. 5, the software module 110 may have been built to include the set(s) of executable instructions 112 for one or more functions 106, but not to include the switching instruction(s) 114 for one or more functions 106.

At 1304, a call to a function 106 from a calling process may be detected and intercepted by the control module 502. In some cases, the call may be an external call 504 from a calling process that is executing on a device that is external to the host device(s) 120. As described with reference to FIG. 5, the control module 502 may inspect one or more packets of the call to determine that the call is to a set of executable instructions 112 corresponding to the particular function 106.

At 1306, the control data 116 corresponding to the function 106 may be accessed by the control module 502. At 1308, a determination is made whether the control data 116 indicates that the function 106 is to be bypassed (e.g., not executed). If the control data 116 does not indicate the function 106 is to be bypassed, the process may proceed to 1310 and allow the call to the function 106. The set of executable instructions 112 for the function 106 may then be executed, and the set of executable instructions 112 may return a return value to the calling process.

If it is determined at 1308 that the function 106 is to be bypassed, the control module 502 may disallow the call to the function 106. The control module 502 may then return error information 1114 indicating that the call has been disallowed. In some cases, the control module 502 may return decoy data 1214 to mislead a potential attacker, as described with reference to FIG. 12.

Although examples may describe using the control data 116 in a binary manner to determine whether or not to execute a set of executable instructions 112 for a function 106, implementations are not so limited. In some implementations, the control data 116 may be employed to constrain the set of executable instructions 112 for a function 106 to be executed a maximum number of times during a time period (e.g., per day). Such a constraint may prevent malicious processes or individuals from repeatedly calling a function 106 in a denial of service attack. The constraint may also prevent malicious processes or individuals from degrading the performance of a system by causing a stack overflow in a software module 106 that may exhibit such a vulnerability.

In some implementations, the control data 116 may be employed to determine which version of the set of executable instructions 112 to execute in cases where there may be multiple versions. For example, a patch may be developed and released for the software module 110 to address a security vulnerability, implement or disable a feature, or for other purposes. After the patch is released, the control data 116 may be updated to indicate that the patched version of the set of executable instructions 112 is to be executed instead of a previous version. In such cases, the control data 116 may list, for each of one or more functions 106, a version number or other identifier of the version to be executed.

Figure 14:
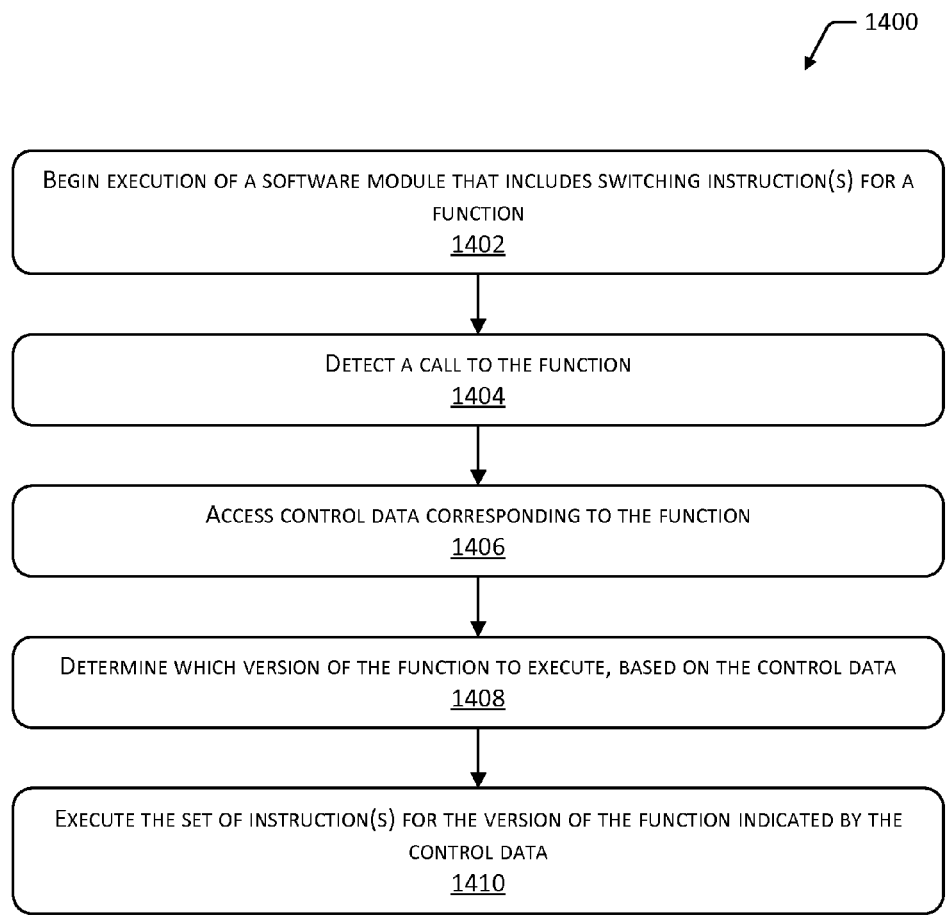
FIG. 14 depicts a flow diagram of a process for dynamically selecting among multiple versions of a portion (e.g., function) of an executable software module based on control data.

FIG. 14 depicts a flow diagram 1400 of a process for dynamically selecting among multiple versions of a portion (e.g., function) of an executable software module 110 based on the control data 116. Operations of the process may be performed by one or more of the software module 110, the control module 502, the other module(s) 814 executing on the host device(s) 120, or other modules executing on other device(s).

At 1402, the software module 110 may begin executing on the host device(s) 120. In some cases, the software module 110 may have been built to include the switching instruction(s) 114 for one or more functions 106. Alternatively, the software module 110 may not include the switching instruction(s) 114, and the switching may be performed via dynamic patching or linking as described with reference to FIG. 6.

At 1404, a call to a function 106 from a calling process may be detected. At 1406, the control data 116 corresponding to the function 106 may be accessed. At 1408, based on the control data 116, a determination may be made which version of the function 106 to execute. At 1410, the set of executable instructions 112 corresponding to the determined version may be executed.

Those having ordinary skill in the art will readily recognize that certain steps or operations illustrated in the figures above may be eliminated, combined, or performed in an alternate order. Any steps or operations may be performed serially or in parallel. Moreover, the methods described above may be implemented as one or more software programs for a computer system and may be encoded in a computer-readable storage medium as instructions executable on one or more processors.

Embodiments may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, and so forth. For example, the computer-readable storage media may include, but are not limited to, hard drives, floppy diskettes, optical disks, read-only memories (ROMs), RAMs, erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art. It is intended that the present disclosure encompass such changes and modifications that fall within the scope of the appended claims.

What is claimed is:

1. A system, comprising:
  at least one computing device configured to implement one or more services, the one or more services configured to:
    present a user interface (UI) on a display device of one of the at least one computing device, the UI including a plurality of controls corresponding to a plurality of switchable sets of executable instructions in source code;
    determine selection information indicating that one or more of the switchable sets of executable instructions associated with a security vulnerability are to be bypassed, the selection information generated through a selection of one of the plurality of controls;
    determine, based on the selection information, control data indicative of bypass of the one or more switchable sets of executable instructions during the execution of the source code;
    compile the source code to generate executable code, the compiling including:
      generating executable function code for a function described in the source code; and
      generating one or more switching instructions, wherein the one or more switching instructions cause the executable function code to be bypassed responsive to the control data including a first value, wherein the one or more switching instructions cause the executable function code to be executed responsive to the control data including a second value, and wherein the one or more switching instructions are not indicated in the source code; and
    set the control data to include the first value to cause the executable function code associated with the security vulnerability to be bypassed during execution of the executable code.

2. The system of claim 1, wherein the generating the one or more switching instructions is responsive to determining that the function is a public function.

3. The system of claim 1, wherein the one or more switching instructions are further configured to emit, responsive to the control data including the first value, one or more of:
  error information indicating that the executable function code has been bypassed; or
  decoy data.

4. The system of claim 3, wherein the error information comprises one or more of a return value, an exception, or an assertion.

5. The system of claim 1, wherein the one or more services are further configured to:
  determine that the security vulnerability has been at least partly removed; and
  set the control data to include the second value to cause the executable function code to be executed during the execution of the executable code.

6. A computer-implemented method, comprising:
  determining a security vulnerability in a software module;
  presenting on a computing device a user interface (UI) including a plurality of controls corresponding to a plurality of switchable sets of executable instructions in the software module associated with the security vulnerability;
  generating, based at least in part on input to the plurality of controls, control data comprising a value to cause the set of executable instructions to be bypassed during execution of the software module;
  executing the software module comprising the set of executable instructions generated through processing a portion of source code of the software module;
  during the executing of the software module, determining that the control data includes the value; and
  during the executing of the software module, bypassing the set of executable instructions that are associated with the security vulnerability responsive to the control data including the value, wherein the bypassing of the set of executable instructions is not indicated in the source code of the software module.

7. The method of claim 6, wherein:
the software module further comprises one or more switching instructions that cause the set of executable instructions to be bypassed responsive to the control data including the value; and
the one or more switching instructions are not indicated in the source code.

8. The method of claim 7, wherein the one or more switching instructions are incorporated into the software module during the processing of the portion of the source code.

9. The method of claim 6, further comprising:
detecting a call to the set of executable instructions from a calling process external to the software module;
disallowing the call to the set of executable instructions, responsive to the control data including the value; and
allowing the call to the set of executable instructions, responsive to the control data not including the value.

10. The method of claim 9, wherein:
the call is received over a network; and
detecting the call to the set of executable instructions further comprises inspecting one or more packets comprising the call to determine that the call is to the set of executable instructions.

11. The method of claim 6, wherein:
the portion is a function described in the source code; and
the processing of the portion of the source code includes compiling the function.

12. The method of claim 6, further comprising:
presenting the UI using one or more of a display, a speaker, or a haptic device.

13. One or more non-transitory computer-readable media storing instructions which, when executed by at least one processor, instruct the at least one processor to perform operations comprising:
presenting on a computing device a user interface including one or more controls;
generating, based at least in part on input to the one or more controls, control data comprising a value indicative of executable instructions to be bypassed during execution of a software module that are associated with a security vulnerability;
processing source code to generate executable code that is executable on at least one computing device;
during the processing of the source code, generating a set of executable instructions corresponding to a portion of the source code; and
generating one or more switching instructions to control execution of the set of executable instructions, the one or more switching instructions not indicated in the source code, the one or more switching instructions configured to perform one or more of:
cause the set of executable instructions associated with the security vulnerability to be bypassed responsive to the control data including a first value; or
cause the set of executable instructions to be executed responsive to the control data including a second value.

14. The one or more computer-readable media of claim 13, wherein:
the set of executable instructions is a first set of executable instructions corresponding to a first version of the portion of the source code;
the one or more switching instructions are further configured to cause a second set of executable instructions to be executed responsive to the control data including the first value; and
the second set of executable instructions corresponds to a second version of the portion of the source code.

15. The one or more computer-readable media of claim 13, wherein:
the processing of the source code includes compiling the source code;
the generating of the one or more switching instructions is performed during the compiling; and
the operations further comprise generating metadata that describes an association between the control data and the set of executable instructions.

16. The one or more computer-readable media of claim 13, wherein generating the one or more switching instructions is responsive to detecting an input parameter to the processing of the source code.

17. The one or more computer-readable media of claim 13, wherein generating the one or more switching instructions is responsive to detecting a directive included in the source code, the directive indicating that the portion of the source code is to be switchable.

18. The one or more computer-readable media of claim 13, wherein the one or more switching instructions are further configured to emit, responsive to the control data including the first value, one or more of:
error information indicating that the set of executable instructions has been bypassed; or
decoy data.

19. The one or more computer-readable media of claim 18, wherein the error information comprises one or more of a return value, an exception, or an assertion.

20. The one or more computer-readable media of claim 13, wherein:
the control data includes a bit corresponding to the portion of the source code;
the first value is a first binary value; and
the second value is a second binary value.

* * * * *